April 18, 1939.　　　　R. GERARDY　　　　2,155,123
FOLDING STEERING WHEEL
Filed April 5, 1938　　　3 Sheets-Sheet 1
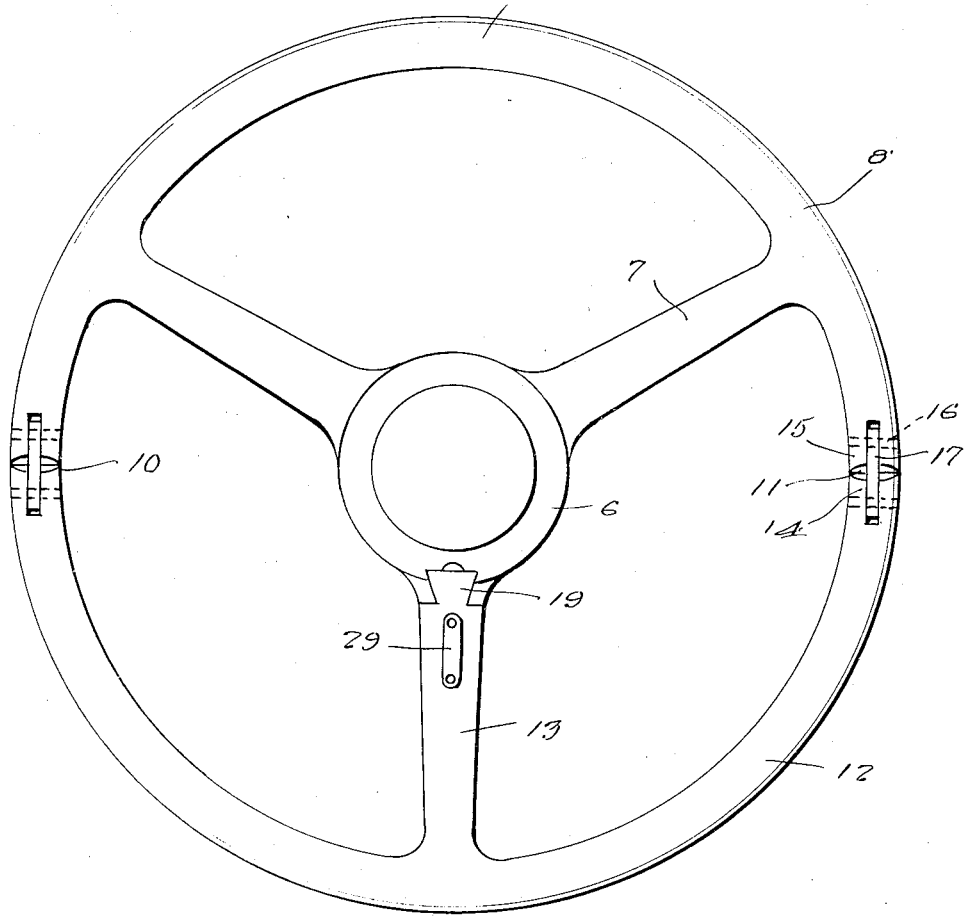
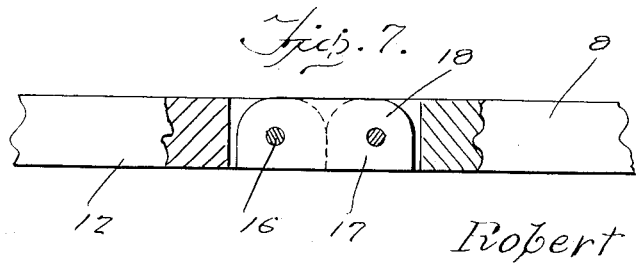
Inventor
Robert Gerardy
By Clarence A. O'Brien
and Hyman Berman
Attorneys Inventor
Robert Gerardy By Clarence A. O'Brien
and Hyman Berman
Attorneys

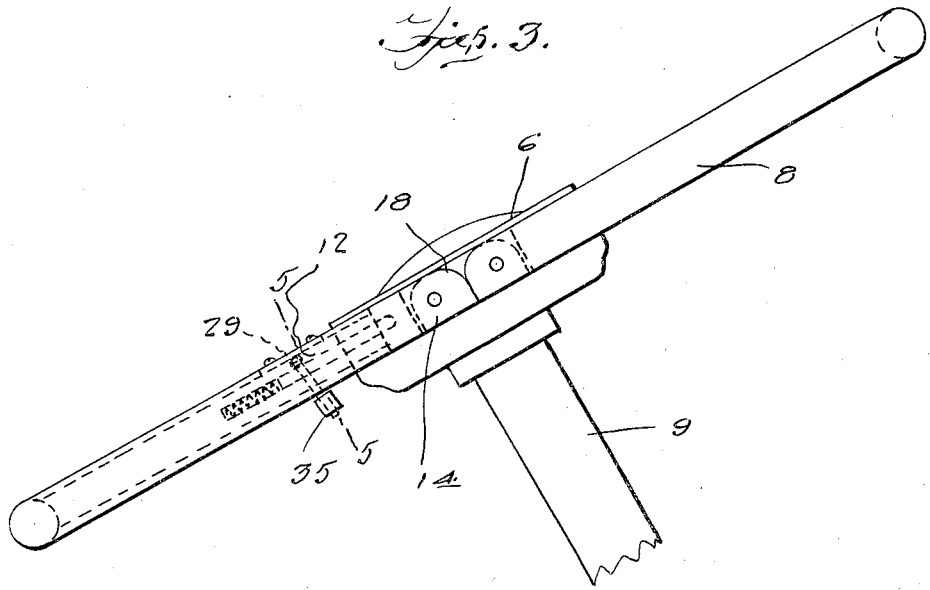
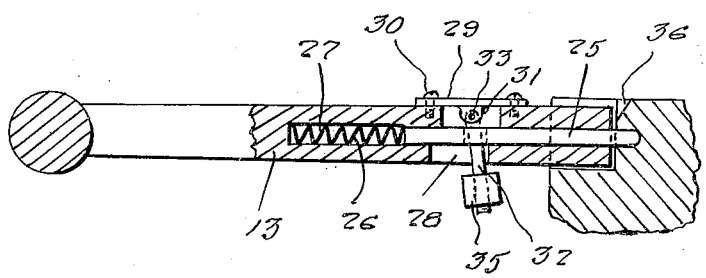
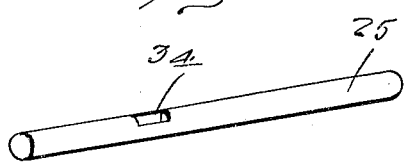

Patented Apr. 18, 1939

2,155,123

UNITED STATES PATENT OFFICE 2,155,123

FOLDING STEERING WHEEL

Robert Gerardy, Atchison, Kans.

Application April 5, 1938, Serial No. 200,184

1 Claim. (Cl. 74—555)

The present invention relates to steering wheels for automobiles and like motor vehicles and has for its primary object to provide a wheel of this character formed of a pair of transversely split sections hingedly connected to each other whereby one of the sections may be folded upwardly upon the other of said sections.

An important object of the present invention is to provide a steering wheel embodying a plurality of foldable sections to provide an increase in the space in the driver's compartment of the vehicle to facilitate the movement of the driver into and out of position behind the steering wheel.

Another object is to provide a foldable steering wheel in which the sections thereof are firmly connected together when in normal position to provide a rigid structure free from play, to eliminate rattle, which at the same time is strong and durable, neat and attractive in appearance and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which Figure 1 is a top plan view showing the wheel in normal position.

Figure 3 is a side elevational view.

Figure 4 is a longitudinal sectional view through the latch mechanism for one of the spokes carried by the folding section of the wheel.

Figure 7 is a fragmentary detail showing the hinged connection for the sections of the wheel, and Figure 8 is a perspective view of the latch pin.

Figure 2:
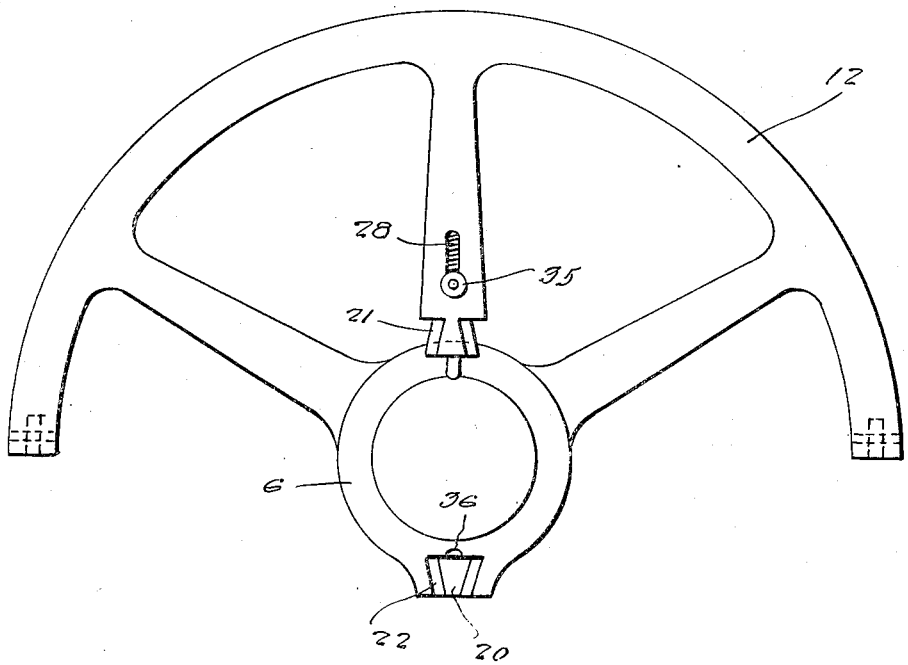
Figure 2 is a similar view showing the wheel in a folded position.
Figure 5:
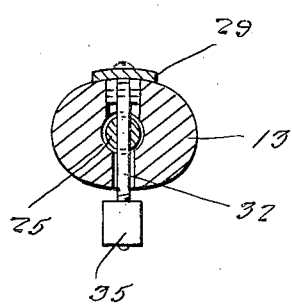
Figure 5 is a transverse sectional view taken substantially on a line 5—5 of Figure 3.
Figure 6:
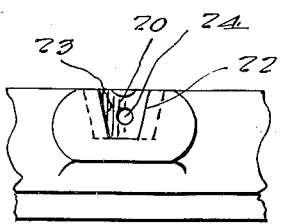
Figure 6 is a detail showing the socket for the latch carried by the spoke.

Referring now to the drawings in detail, wherein for the purpose of illustration I have disclosed the preferred embodiment of the invention, the numeral 5 designates the steering wheel generally of an automobile or other motor vehicle which embodies a hub portion 6 from which spokes 7 extend radially for supporting the rim 8 of the wheel. The hub 6 is mounted on the usual steering column 9.

The rim 8 of the wheel is split transversely at diametrically opposite sides, as indicated at 10 and 11 to provide a folding section 12 which carries one of the spokes 13. The split ends of the section 12 and the split ends of the fixed section of the wheel are bifurcated as shown at 14 and 15 respectively, and provided with pins 16 extending transversely thereof, and to which the opposite ends of a link or hinge member 17 is pivotally connected, the ends of the links being inserted between the furcations of each of the sections whereby to enable the section 12 to be folded upwardly from the position shown in Figures 1 and 3 of the drawings, into a position for overlying the fixed section of the wheel as shown in Figure 2. The upper surface of the furcations 14 and 15 are rounded as shown at 18 to facilitate the folding action of the hinged section 12, as shown in detail in Figure 7 of the drawings.

In order to lock the foldable section against movement the inner end of the spoke 13 is provided with a dove-tailed shaped extension 19 adapted to conformably seat in a complementary shaped socket formed on an adjacent side of the hub 6, the side walls of the extension 19 as well as the side walls of the socket 20 being inclined downwardly and inwardly as shown at 21 and 22 respectively, whereby to provide for the wedging fit of the extension in the socket.

The inner wall 23 of the socket is formed with a recess 24 to receive the end of a latch pin 25 slidably mounted in and projecting outwardly from the free end of the spoke.

The inner end of the latch pin 25 is projected outwardly by a coil spring 26 positioned in a socket 27 formed in the spoke 13, as clearly shown in Figure 4 of the drawings.

The spoke is formed with a vertically extending slot 28 over the top of which is secured a plate 29 by screws 30, the under side of the plate being positioned in the slot 28 and formed with a lug 31 to which a lever 32 is pivotally attached as at 33, the lever depending downwardly through a slot 34 formed in the latch pin 25 and projecting downwardly below the spoke and provided at its lower end with a handle or knob 35. The upper inner edge of the socket 20 is formed with an inclined recess 36 to facilitate the sliding of the projected end of the latch pin 25 over the upper edge of the socket during the lowering movement of the folding section 12 to facilitate entrance of the extension 19 of the spoke into the socket whereupon the latch pin 25 will be projected into locking position in the recess 24 of the socket and thus secure the folded section of the wheel in a locked or rigid position with respect to the fixed section thereof.

In order to move the foldable section into its folded position the lever 32 is swung in a direction toward the left in Figure 4, or away from the hub of the wheel whereby the latch pin 25 is released permitting the section 12 to be folded upwardly.

It is believed the details of construction and operation of the device will be readily understood from the foregoing, without further detailed explanation.

Having thus described the invention, what I claim is—

A foldable steering wheel comprising a hub having spokes extending radially therefrom, a rim carried by said spokes, said rim being split transversely the adjacent split ends of the rim being bifurcated, a link having its opposite ends positioned in the furcations of adjacent rim sections and pivoted thereto to provide a fixed rim section and a foldable rim section, the latter being foldable in superposed relation upon the fixed rim section, a dove-tailed socket formed in the hub, a dove-tailed extension formed on a spoke carried by the foldable section and adapted to conformably seat in said socket and latch means releasably securing the spoke to the hub to secure the sections against movement in a normal position.

ROBERT GERARDY.